(12) United States Patent
Wilkins

(10) Patent No.: US 11,587,030 B1
(45) Date of Patent: Feb. 21, 2023

(54) SYSTEMS AND METHODS FOR INVENTORY CONTROL AND DELIVERY USING UNMANNED AERIAL VEHICLES

(71) Applicant: Amazon Technologies, Inc., Seattle, WA (US)

(72) Inventor: Steven James Wilkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 17/008,993

(22) Filed: Sep. 1, 2020

Related U.S. Application Data

(62) Division of application No. 15/796,538, filed on Oct. 27, 2017, now Pat. No. 10,796,275.

(51) Int. Cl.
| | |
|---|---|
| *G06Q 10/08* | (2012.01) |
| *A01D 46/30* | (2006.01) |
| *B64C 39/02* | (2006.01) |
| *G06T 7/90* | (2017.01) |
| *G06Q 10/087* | (2023.01) |

(52) U.S. Cl.
CPC ........... *G06Q 10/087* (2013.01); *A01D 46/30* (2013.01); *B64C 39/024* (2013.01); *G06T 7/90* (2017.01); *B64C 2201/126* (2013.01); *B64C 2201/128* (2013.01)

(58) Field of Classification Search
CPC .... G06Q 10/087; A01D 46/30; B64C 39/024; B64C 2201/126; B64C 2201/128; G06T 7/90
See application file for complete search history.

(56) References Cited

U.S. PATENT DOCUMENTS

| | | | |
|---|---|---|---|
| 2002/0082893 A1* | 6/2002 | Barts | G06Q 10/08355 705/334 |
| 2014/0089138 A1* | 3/2014 | Borders | G06Q 10/0631 705/26.8 |

(Continued)

FOREIGN PATENT DOCUMENTS

| | | | |
|---|---|---|---|
| WO | WO2016081794 A1 * | 7/2016 | |

OTHER PUBLICATIONS

Office Action for U.S. Appl. No. 15/796,538, dated Apr. 10, 2020, Wilkins, "Systems and Methods for Inventory Control and Delivery Using Unmanned Aerial Vehicles", 13 Pages.

*Primary Examiner* — Frederick M Brushaber
(74) *Attorney, Agent, or Firm* — Lee & Hayes, P.C.

(57) ABSTRACT

Unmanned aerial vehicles (UAVs) may be configured and deployed to maintain inventory and retrieve products for delivery. The UAVs can be equipped with a plurality of sensors used to assess the condition of inventory items, report the condition to a central control, and to retrieve inventory items. The UAVs can scan fruits and vegetables, for example, to determine the current ripeness. The UAV can then harvest the items if ready or provide a status update if they are not ready. The UAVs can be used in conjunction with transporters and harvesters to deliver products from the field or warehouse to a central control or directly to the customer. In scanning the products for readiness, the UAVs can also detect issues such as spoilage, fungus, and pests. This information can be used for the specific application of treatments.

20 Claims, 9 Drawing Sheets

(56) References Cited

U.S. PATENT DOCUMENTS

| | | | | |
|---|---|---|---|---|
| 2015/0156747 | A1* | 6/2015 | Skaaksrud | H04W 76/10 |
| | | | | 455/456.1 |
| 2016/0307151 | A1* | 10/2016 | Grabovski | G06Q 20/3224 |
| 2016/0318607 | A1* | 11/2016 | Desai | B64C 39/022 |
| 2017/0094909 | A1* | 4/2017 | Bhavani | A01D 46/30 |
| 2017/0231213 | A1* | 8/2017 | Gordon | A01M 25/00 |
| | | | | 43/132.1 |
| 2017/0258005 | A1* | 9/2017 | Cutter | B64D 1/18 |
| 2019/0066047 | A1* | 2/2019 | O'Brien | G06Q 10/0838 |
| 2019/0102623 | A1* | 4/2019 | Flood | B64C 39/024 |

\* cited by examiner

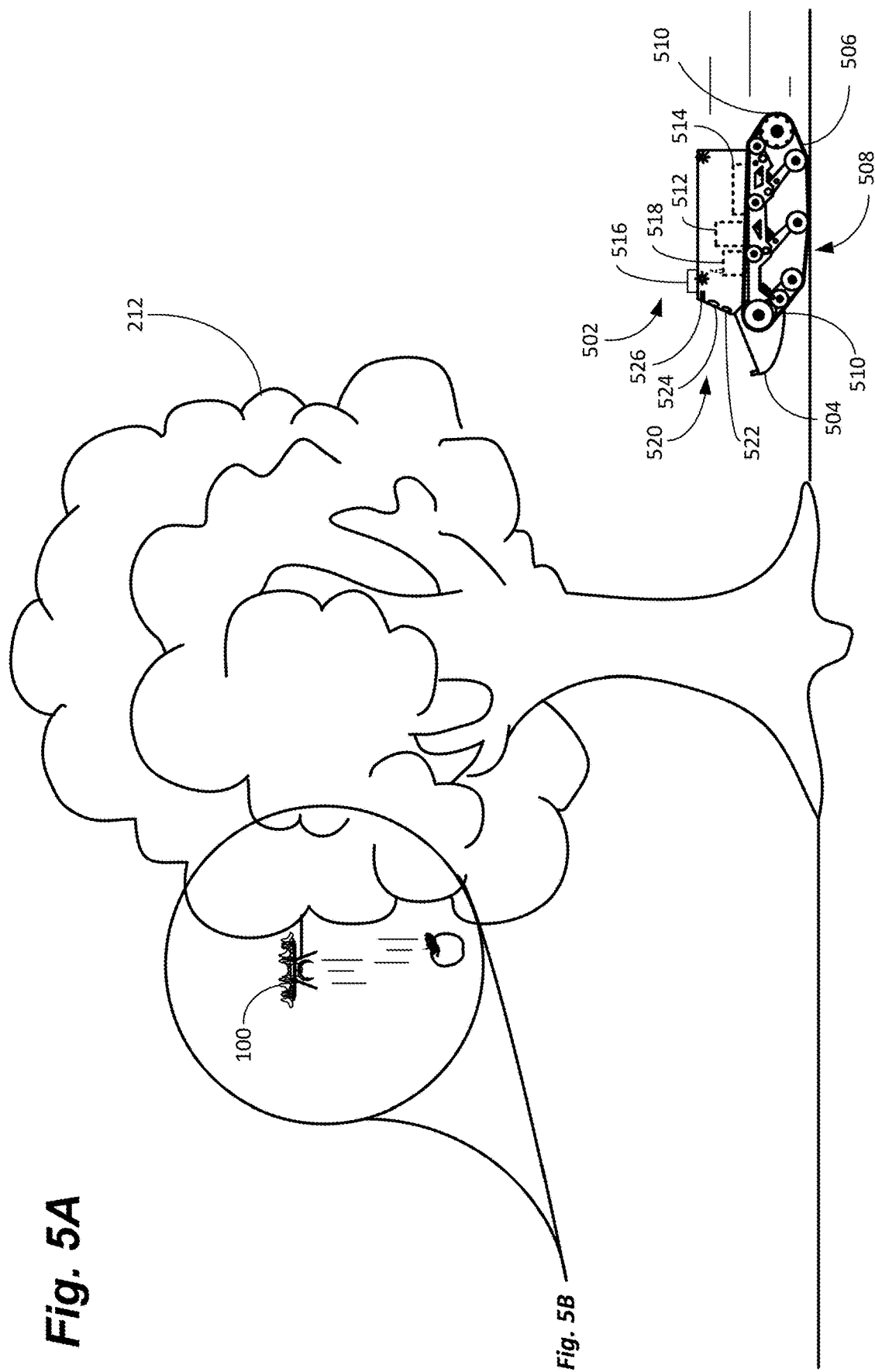

SYSTEMS AND METHODS FOR INVENTORY CONTROL AND DELIVERY USING UNMANNED AERIAL VEHICLES

CROSS REFERENCE TO RELATED APPLICATIONS

This disclosure is a divisional of, and claims priority under 35 USC § 121 to, U.S. patent application Ser. No. 15/796,538, filed Oct. 27, 2017, which is incorporated herein by reference as if fully set forth below.

BACKGROUND

Unmanned aerial vehicles (UAVs) comprise a variety of vehicles, from conventional fixed wing airplanes, to helicopters, to ornithopters (i.e., machines that fly like birds), and are used in a variety of roles. They can be remotely piloted—by a pilot on the ground—or can be autonomous or semi-autonomous vehicles that fly missions using preprogrammed coordinates, GPS navigation, etc. UAVs can include remote control helicopters and airplanes for the hobbyist, for example.

UAVs may be equipped with cameras and other sensors to provide data during flight, which may be used for navigational or other purposes, e.g., identify a house address, etc. UAVs can also be equipped with sensors to provide local weather and atmospheric conditions, radiation levels, and other conditions. UAVs may also include cargo bays, hooks, or other means for carrying payloads.

Newer generation UAVs may also provide significant payload capabilities. As a result, UAVs can also be used for delivering packages, groceries, mail, and other items. The use of UAVs for deliveries can reduce costs and increase speed and accuracy. Direct delivery from source to consumer, for example, can ensure freshness and quality for perishable items like food and flowers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5A depicts a UAV working in concert with a transporter to deliver a product to a central control, in accordance with some examples of the present disclosure.

DETAILED DESCRIPTION

Examples of the present disclosure relate generally to unmanned aerial vehicles, or "UAVs," and specifically to systems and methods for maintaining inventories, identifying products, and providing delivery via UAV. The UAVs may incorporate several features to enable the UAV to locate goods that are ready for delivery, harvest the goods, and/or deliver the goods—directly or indirectly—to the end consumer. In some examples, the UAVs may also provide additional services such as assessing and maintaining inventory levels and identifying pests, blight, and other issues that may require the application of pesticides, herbicides, or require human intervention.

To simplify and clarify explanation, the disclosure is described herein as a system and method for enabling UAVs to provide inventory, delivery, and other services. One skilled in the art will recognize, however, that the disclosure is not so limited. While, the system may be described as a system to deliver produce, for example, one of skill in the art will recognize that the system may just as easily be used to deliver flowers, baked goods, and other perishable items, or indeed, any item with a finite shelf life. In addition, the system is described herein for use with UAVs, but could also be applied to, or used in conjunction with, other vehicles using different form factors such as ground-based harvesting tractors and autonomous delivery vans.

The term "readiness" is used herein to describe a variety of conditions for different products that signal they are ready for delivery to a customer. For fruit or vegetables, readiness can be a measure of ripeness, for example, including under ripe and over ripe conditions depending on the application. For bread, beer, and other products, readiness can mean that the bread has cooled, the beer has been bottle, or the flowers have been cut. Other products, such as non-perishable items, may be ready for delivery once they have been packaged and placed on a shelf. Thus, this term is not meant to be either limiting or ambiguous, rather one of skill in the art is entirely capable of interpreting this term with respect to almost any respective product.

Figure 1A:
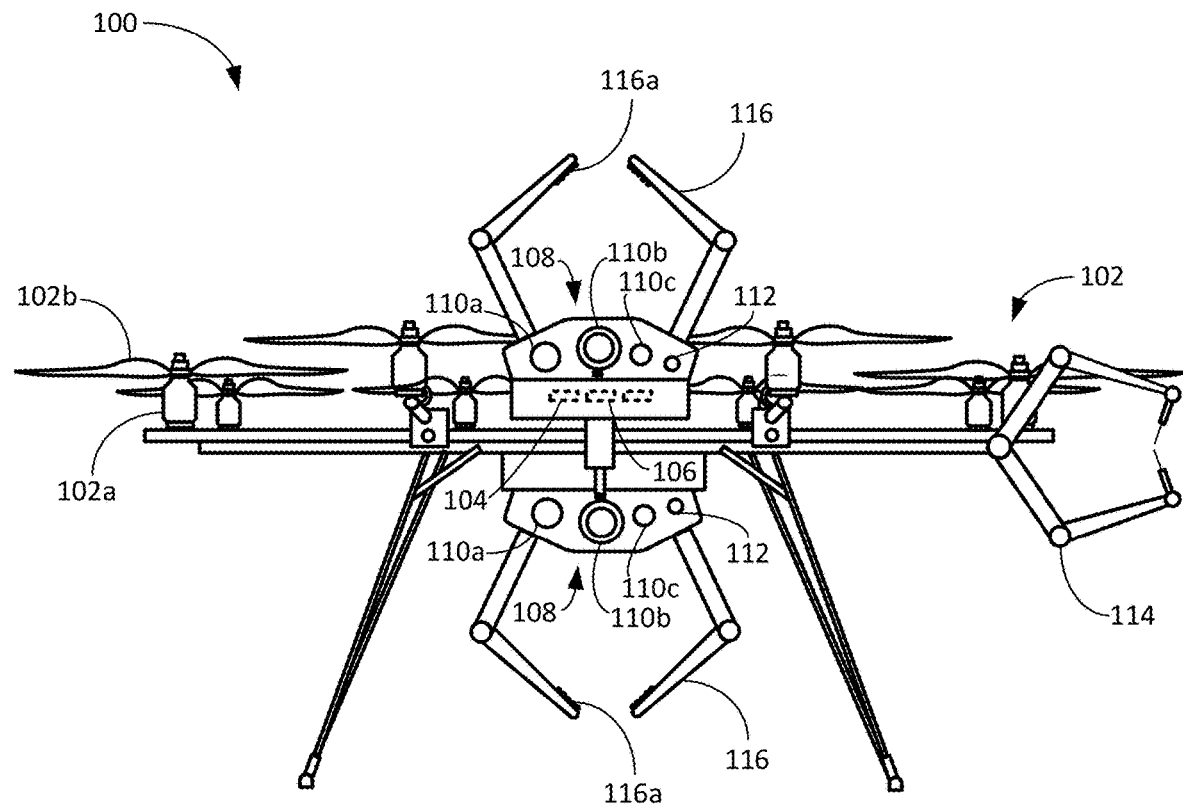
FIG. 1A depicts an unmanned aerial vehicle ("UAV") useful for maintaining inventory and retrieving items, in accordance with some examples of the present disclosure.

As shown in FIG. 1A, examples of the present disclosure can comprise a UAV 100 with several features to enable it to assess and/or retrieve various goods. The UAV 100 can comprise a propulsion system 102, including one or more motors 102a, each with a rotor 102b. Of course, as mentioned above, the UAV 100 could have a single rotor 102b like a helicopter, or wings and a propeller, like a plane, depending on the mission and flight area.

Regardless, the UAV 100 can also include a navigation system 104 and a stability system 106. As the name implies, the navigation system 104 can enable the UAV 100 to maneuver from a starting location (e.g., a central control 204, discussed below), to a location to assess and retrieve a product and, in some case, to deliver the product to a delivery location. The stability system 106 can enable the UAV 100 to maintain stable flight and can adjust for changes in wind loading, speed, and weight distribution, for example, caused by picking, or picking up, the product.

The UAV 100 can also include a sensor package 108. The sensor package 108 can include, for example, one or more imagers 110, microphones 112, probes 114, and manipulators 116. The imagers 110 can comprise, for example, one or more cameras 110a, an infrared sensor 110b, and one or more internal imagers 110c. The camera 110a can comprise a still or video camera and can comprise any known types of digital image sensors, digital or analog cameras, and/or digital or analog video cameras. The camera(s) 110a can be high dynamic range (HDR) cameras, for example, to provide improved accuracy of the images. In some examples, the camera(s) 110a can include one or more of light-sensitive cameras, range sensors, or other types of imagers. Other suitable types of imagers are contemplated.

The infrared sensor 110b can provide thermal imaging of the area of operation and of the product. The internal imagers 110c can comprise, for example, X-ray, tomography devices, RADAR, and/or ultra-sonic cameras to enable the UAV 100 to see "inside" the product or other objects. The imagers 110 can collectively provide two-dimensional (2-D) image data, two and a half-dimensional (2.5d, or depth maps), and/or three-dimensional (3D) image data, image sequences, gray image data, and/or color image data. In some examples, the imagers 110 may be selected to provide depth data, absorption data, and/or reflectance data as a means of detecting ripeness, pests, and other conditions.

The imagers 110 can also enable the UAV 100 to discern the condition of the product. So, for example, if the product is red delicious apples, a color camera 110a may be used to assess the color a plurality of apples on a tree to determine one or more of the apples that are ready for harvest, or soon will be. The UAV 100 may also use the infrared sensor 110b, for example, to detect ripeness, pests, and other conditions. Finally, the UAV 100 can use the internal imager 110c, where appropriate, for the same purposes.

In some examples, the sensor package 108 can also comprise one or more probes 114. The probes 114 can comprise, for example, an electrical probe, an optical probe, a pressure transducer, or a refractometer (or, "Brix meter"). In some examples, the probes 114 can be inserted into the product (e.g., an orange or a pear) and can measure the electrical resistance, the physical resistance (i.e., the force required to insert the probe), and other physical properties to determine the condition (e.g., the ripeness) of the product. The electrical resistance can be indicative of the water content of the product, for example, while the physical resistance can be a good indicator of ripeness—i.e., many products soften as the ripen. In other examples, the probes 114 can remove a small amount of fluid, or juice, from the product for analysis with a refractometer, which can enable the sugar content of the product to be determined. For many products, such as fruits and vegetables, the sugar content of the product is a good indicator of ripeness and/or quality.

In some examples, the UAV 100 can include one or more manipulators 116. The manipulators 116 can comprise a robotic arm, pincers (shown), or other devices for moving, lifting, and/or holding a variety of items. The manipulators 116 can be above and/or below the propulsion system 102 to enable access from above and below, for example, and may also include additional tools located in other areas. In some examples, the manipulators 116 can comprise rubber grips or knurling 116a to improve the grip between the manipulators 116 and the objects to be lifted and/or carried. In other examples, as discussed below, the manipulators 116 can also include scissors or blades to cut stems or branches when harvesting produce, for example.

Figure 1B:
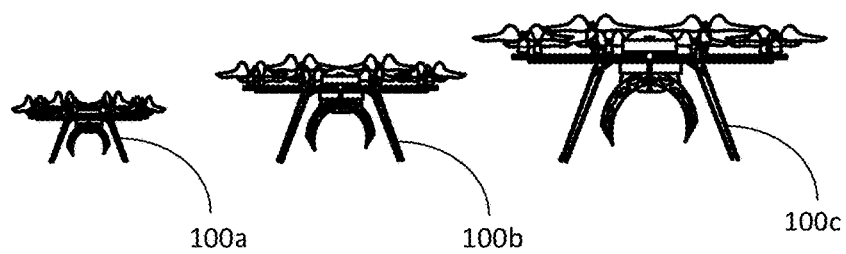
FIG. 1B depicts three UAVs of various sizes for maintaining inventory and retrieving items, in accordance with some examples of the present disclosure.

As shown in FIG. 1B, in some examples, the system can include a variety of different sized UAVs 100. In some examples, the system can comprise small UAVs 100a, medium UAVs 100b, and large UAVs 100c. In some examples, the UAVs 100 can be categorized by payload capacity. For example, small UAVs 100a could be capable of from approximately 0-5 lbs., while medium UAVs 100b could be capable of carrying between 0-10 lbs., while the large UAVs 100c could be capable of carrying up to 50 lbs. Of course, other payload capacities, including payloads up to 500 lbs and more are possible. These ranges are intended to be exemplary and are not in any way limiting.

In this manner, the system can assign a suitable sized UAV 100 based on the product to be retrieved and/or delivered. Small products can be assigned to small UAVs 100a, for example, to reduce costs, improve access, and/or increase delivery speed. In other words, if the product is an apple that needs to be picked, a small UAV 100a can fly in between branches without hitting the branches with the rotors 102b. Larger products that are more easily retrieved, on the other hand, can be assigned to medium 100b or large 100c UAVs with larger payloads. So, for example, larger products, or multiple products, that weigh more, but that are easily accessible—e.g., they grow on the top of the plant or have already been harvested and simply need to be retrieved—can be retrieved and delivered using the larger UAVs 100b, 100c.

In some examples, the products can also be assigned to UAVs 100 based on prevailing weather conditions. In other words, a small or medium package can nonetheless be assigned to a large UAV 100c due to strong winds or driving rain, for example. Of course, the UAVs 100 can be classified in several additional ways including, but not limited to, size, sophistication, energy efficiency, payload, range, and top speed. So, for example, a UAV 100 with a more sophisticated navigation system 104 may be chosen for direct delivery of a product, regardless of the size of the product. Similarly, a UAV 100 with a more sophisticated stability system 106 may be chosen to pick fruit that is particularly difficult to harvest, for example, or oddly shaped.

Figures 1C, 1D:
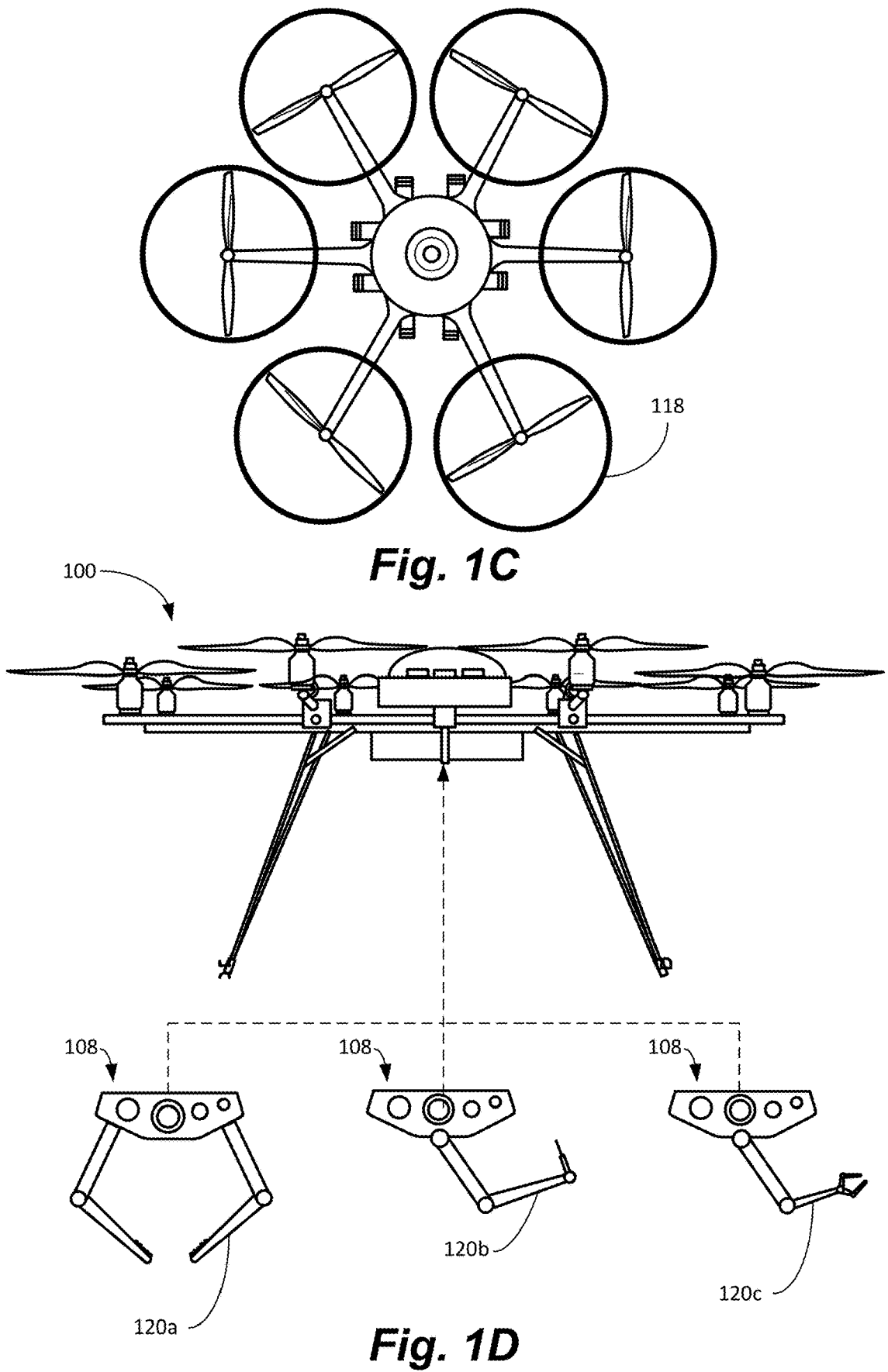
FIG. 1C depicts a UAV with rotor guards useful for maintaining inventory and retrieving items, in accordance with some examples of the present disclosure.
FIG. 1D depicts a UAV with modular tools useful for maintaining inventory and retrieving items, in accordance with some examples of the present disclosure.

As shown in FIG. 1C, to prevent the rotors 102b from contacting surrounding objects (e.g., branches), one or more of the rotors 102b can also include rotor guards 118. The rotor guards 118 can be plastic or metal, for example, and can substantially surround the rotor 102b. In some examples, the rotor guards 118 can also include a venturi, or other aerodynamic feature, to improve the efficiency of the propulsion system 102. The rotor guards 118 could act as ducts, for example, to enable the rotors 102b to perform as ducted fans.

As shown in FIG. 1D, in some examples, the manipulators 116 can be modular to enable the UAV 100 to utilize different tools for different jobs. The manipulators 116 can include, for example, the aforementioned pincers 120a, a probe 120b, and a robotic arm 120c. Thus, the UAV 100 may use the robotic arm 120c for picking apples, for example, and then switch to the probe 120b to conduct inventory. In some examples, the UAV 100 can also use one manipulator 120 on the bottom of the UAV 100 and a different manipulator on the top of the UAV 100 to enable the UAV to perform multiple tasks without exchanging tools.

In some examples, the manipulator 120 can also include a weight sensor such as, for example, a strain gauge or a load cell. A strain gauge or load cell can be mounted on the robotic arm 120c, for example, such that when the robotic arm lifts an item, the weight of the item can be detected. This can enable users to order a specific size of apple, for example, or a particular weight of something (e.g., a pound of cherries).

In some examples, as shown, the sensor package 108 can be paired to the manipulator 116. In other words, different sensors may be more compatible with different manipulators 116 or the tasks that are performed with that manipulator 116. The sensor package 108 paired with the probe 120b, for example, may include a reader 108a, such as an RFID or bar code reader, to read tags on products as inventory is being taken. The sensor package 108 paired with the pincers 120a, on the other hand, can include a high-definition camera 110a, for example, to enable the UAV 100 to identify ripe fruit when harvesting. Of course, in some examples, the sensor package 108 can be mounted on the UAV 100 and the manipulators 116 can be changed independently.

Figure 2:
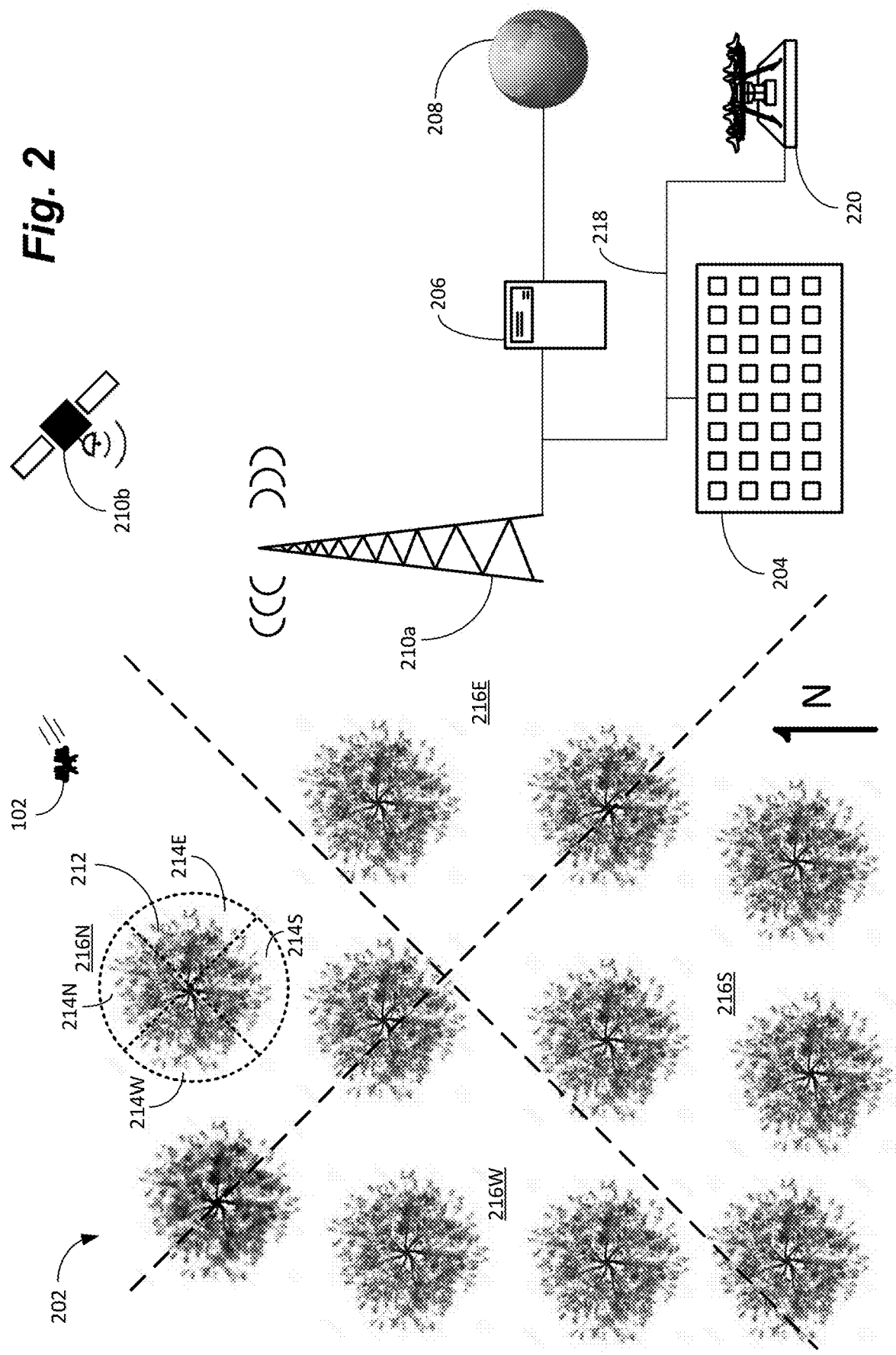
FIG. 2 depicts an inventory maintenance and order fulfillment system using UAVs, in accordance with some examples of the present disclosure.

As shown in FIG. 2, the UAVs 100 can be used for multiple functions. The UAVs 100 can use the sensor package 108 to maintain an inventory in an area 202. The UAVs 100 can also use the sensor package 108 to choose and harvest products that are ready for harvest. The UAVs 100 can also deliver the products, either to a central control 204 or directly to the consumer. The UAVs 100 can also monitor conditions and schedule treatment and/or disposal for disease (e.g., fungus, mildew, etc.), insects, water, and fertilizer, among other things. Products that have become unsellable for some reason—i.e., they cannot be treated because they are "too far gone"—can simply be removed from the tree 212. Unsellable products may simply be thrown away or composted or can be used for animal feed or other purposes.

Indeed, a major inefficiency in many types of farming is the need to harvest the crop all at once. Because large machines and relatively coarse methods are used, crops are typically harvested when some, but not all, of the crop is ready for harvest. In other words, the crop is generally harvested when some portion of the crop is ripe, but some is over ripe and some is under ripe. Depending on the crop, this causes a certain amount of spoilage as the over ripe products spoil before being sold. In addition, some crop may not ripen after being harvested (i.e., once it is removed from the plant, it no longer ripens), leading to product that cannot be sold because it never ripens. It is estimated that 30-40% of food produced in the United States is wasted in one way or another. See, e.g., "U.S. Food Waste Challenge—FAQ", USDA (2016) available at www.usda.gov/oce/foodwaste/faqs.htm.

The UAVs 100 can operate within an area 202 and can be in communication with a central control 204, or other entity, that can include shipping and receiving, order taking, UAV 100 maintenance and charging, and other functions. The UAVs 100 also be in communication with a remote server 206 and/or the Internet 208 to provide reporting and inventory control to a remote inventory system, for example. In some examples, the UAVs 100 can also be in communication with one or more cellular 210a or satellite 210b communication sites. This can provide communications, cellular location service, global positioning system (GPS), and other, location data, and other functions.

The efficiency of harvest can be improved significantly with improved data and selective harvesting. Thus, the UAVs 100 can be used to monitor the status of product in the area 202, such as fruit in an orchard (shown) to provide more selective harvesting. Fruit located on the tree 212 such that the tree 212 or the fruit has southern exposure, for example, may ripen more quickly than fruit or trees 212 with northern exposure. Similarly, trees 212 trees located near a water source or in a valley may mature at different rates than trees 212 in drier locations.

To this end, in some examples, each tree 212 can be divided into sections (e.g. quadrants 214, as shown) and periodically assessed by the UAVs 100. So, the UAV 100 may approach a tree 212 and survey one or more apples in each quadrant 214, for example, to determine how many apples are ready for harvest. This information can be sent via the wireless connection 210 to the central control 204 and stored in a database. When a particular tree 212 or quadrant 214 contains a sufficiently high percentage of fruit at the desired stage of ripeness, the fruit on that tree 212, in that quadrant 214, or even at the individual branch or individual fruit level can be harvested.

The UAVs 100 can survey each quadrant 214 of each tree, or indeed, each fruit individually and provide location and ripeness information to the central control 204. Thus, the UAV 100 can provide a tree number, for example, a quadrant 214 (e.g., 214N, 214E, 214S, 214W) and even a precise location (e.g., GPS coordinates, high, medium, low, etc.) in the tree 212 to provide increased granularity and accuracy for inventory data. This can enable the area 202 to be harvested more strategically, reducing waste and improving yield.

In some examples, depending on the product or the area 202, the UAV 100 can survey the area 202 at somewhat less granularity. In this configuration, the area 202 can be divided into sectors 216, for example, to assess the products in each sector 216. This may be useful in very large areas 202, for example, where assessment of each tree 212 or quadrant 214 is impractical. This may also be useful in areas 202 or for products that have less variability. In other words, some products (e.g., apples) may have variability with respect to orientation (e.g., north, east, south, west), but very little variability from tree 212 to tree 212. In this situation, providing four sectors 216N, 216E, 216S, 216W may be sufficient to account for variability due to orientation.

Indeed, as part of the ordering process, a customer may be able to indicate that they would like an avocado, for example, to make guacamole in two days. Based on an algorithm for this purpose, the UAV 100 can harvest an avocado that is "two days under ripe." This can be accomplished in real-time by the UAV 100 using the sensor package 108, for example, and can be based on a combination of sensor data and a recent inventory performed by the UAVs 100 and stored at the central control 204 or remote server 206. The UAV 100 can go to a particular location, for example, locate the desired product, harvest the product, and then either return it to the central control 204 for delivery via another means (e.g., via a delivery company) or delivery the product directly to the customer.

In some examples, the central control 204 can also be in communication with the UAVs 100 via a wired connection 218 (e.g., via a docking station 220). Thus, in some examples, the central control 204 can be in constant, or periodic, communication with the UAVs 100 via a cellular, radio frequency (RF), or other suitably long-range wireless connection. In other examples, the central control 204 can be in communication with the UAVs 100 only when the UAVs 100 are on, in sufficient proximity to the central control 204, or docked in the docking station 220. In some examples, the docking station 220 can comprise a wired connection 218, a charging/refueling connection, and other maintenance services for the UAVs 100.

Figure 3:
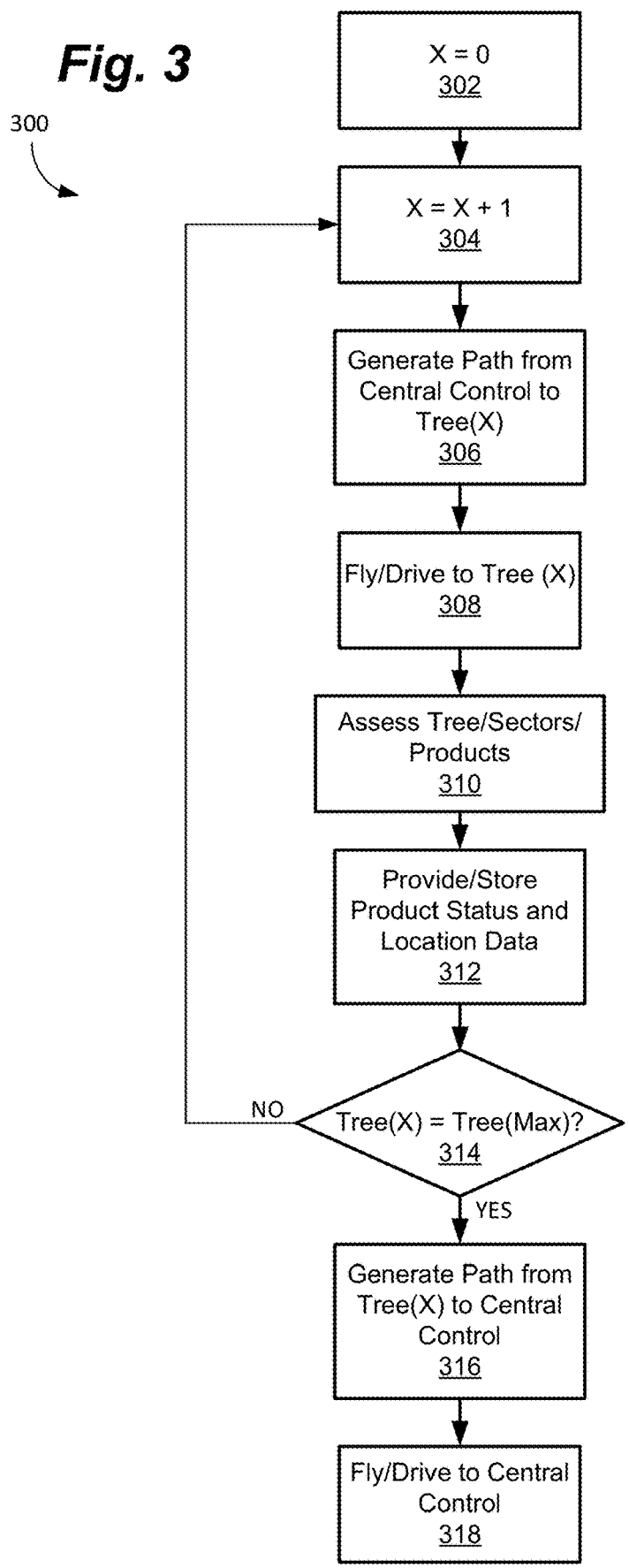
FIG. 3 is a flow diagram depicting a method of maintaining an inventory using UAVs, in accordance with some examples of the present disclosure.

As shown in FIG. 3, examples of the present disclosure can also comprise a method 300 for maintaining an accurate inventory using the UAVs 100. At 302, a counter, which can be used to ensure that the UAV 100 assesses each tree 212, quadrant 214, sector 216, shelf, or another unit is set to zero. At 304, the counter is incremented by one. In this manner, the UAV 100 can assess each unit of inventory at the desired level of granularity. As mentioned above, this ensures that the UAV 100 covers each unit of inventory such as, for example, each tree 212, bush, row, shelf, or another unit.

Regardless, at 306, the UAV 100 can generate a path from its current location (e.g., in the docking station 220 or at the central control 204) to the first unit to be inventoried, in this case Tree 212(1). This may be the tree 212 in an orchard that is closest or farthest from the central control 204, for example, or simply the first tree in a pattern used to cover all, or a portion, of the trees 212 in the orchard. In other words, the UAV 100 may cover all of the trees 212 in one mission, or cover a portion of the trees 212, return to the central control 204 to refuel/recharge, and then cover another portion of the trees 212, etc.

At 308, regardless of the pattern, the UAV 100 can fly from the central control 204 to Tree 212(1). The flight path can comprise the shortest distance from the central control 204 to Tree 212(1), for example, or can include weather or obstacle avoidance or other features.

At 310, regardless of the path, the UAV 100 can assess all of Tree 212(1), a quadrant 214 including Tree 212(1), or some other portion of the area 202 using the sensor package 108. As mentioned above, this can include, for example, taking external and internal images of fruit or vegetables on the tree with the various imagers 110, probing the tree 212 with the probe 114 to determine sugar content, water content, or other conditions. In some examples, the UAV 100 can include an algorithm to calculate "ripeness," or other statuses, directly. In other examples, the UAV 100 can merely collect data for transmission and analysis by the central control 204 or remote server 206.

In some examples, the UAV 100 can assess all of the products on each tree 212, a random assortment of products on each tree 212, each quadrant 214 of each tree 212, or in each sector 216 of the area 202. The level of granularity can be selected based on the product, the topography of the area 202, and local conditions, among other things. In other words, if all the trees 212 are in a relatively small area 202, the topography is relatively flat and consistent, or the product has relatively low variability, a somewhat lower granularity can be used, and vice-versa.

With produce and other items, the location of a particular apple, for example, may vary somewhat. The branch may bend down under the weight of the fruit as is develops, for example, or in response to heavy rain and higher water content in the tree. Thus, a static location provided by a GPS or laser sensor, for example, may only provide a general location. To this end, in some examples, when doing inventory, the UAV 100 can also place a tracking tag on the products. So, for example, the UAV 100 can place a sticker with a bar code or radio frequency identification (RFID) tag, for example, on each apple. In this manner, the UAV 100 can fly to the general location of the product based on the tree 212 and quadrant 214 location, for example, and then scan the product in that area for the appropriate bar code.

At 312, the UAV 100 can either store the collected data for Tree 212(1) or transmit the data to the central control 204 (e.g., via one of the wireless connections 210). In some examples, the UAV 100 can include internal memory to store inventory data, which can then be downloaded via the docking station 220, or other component, at the central control 204. In other examples, the UAV 100 can include a wireless transceiver and can transmit the data, in real-time or periodically, via the wireless connections 210.

At 314, the UAV 100 can determine if all of the trees 212 have been assessed for this mission—i.e., if Tree 212(1) =Tree 212(Max). So, for example, if there are ten trees to be assessed on the current mission, then the method 300 returns to 304 to iteratively continue. At 304, the counter is incremented by one, in this case, to Tree 212(2) and the method 300 repeats.

At 316, if the UAV 100 is currently at tree 212(MAX) (e.g., tree 212(10) in the example above), on the other hand, the UAV 100 can generate a path from the current location (i.e., the location of tree 212(MAX)) back to the central control 204. In most cases, this path can be the simplest or straightest path back to the central control 204. Of course, in some cases, weather conditions, such as rain or wind, may have some effect on the path. So, for example, the UAV 100 may maneuver behind a hill to avoid prevailing winds prior to heading back to the central control.

At 318, the UAV 100 can fly back to the central control 204. In some cases, the UAV 100 can dock with the docking station 220 to refuel/recharge for the next mission. In some cases, the UAV 100 can also download gathered data from the previous mission. Regardless, the UAVs 100 can be used to provide timely, highly granular inventory of products to reduce spoilage, increase production, and improve quality. Indeed, products can be selected down to the very day or hour when they are at peak ripeness, freshness, etc.

Figure 4:
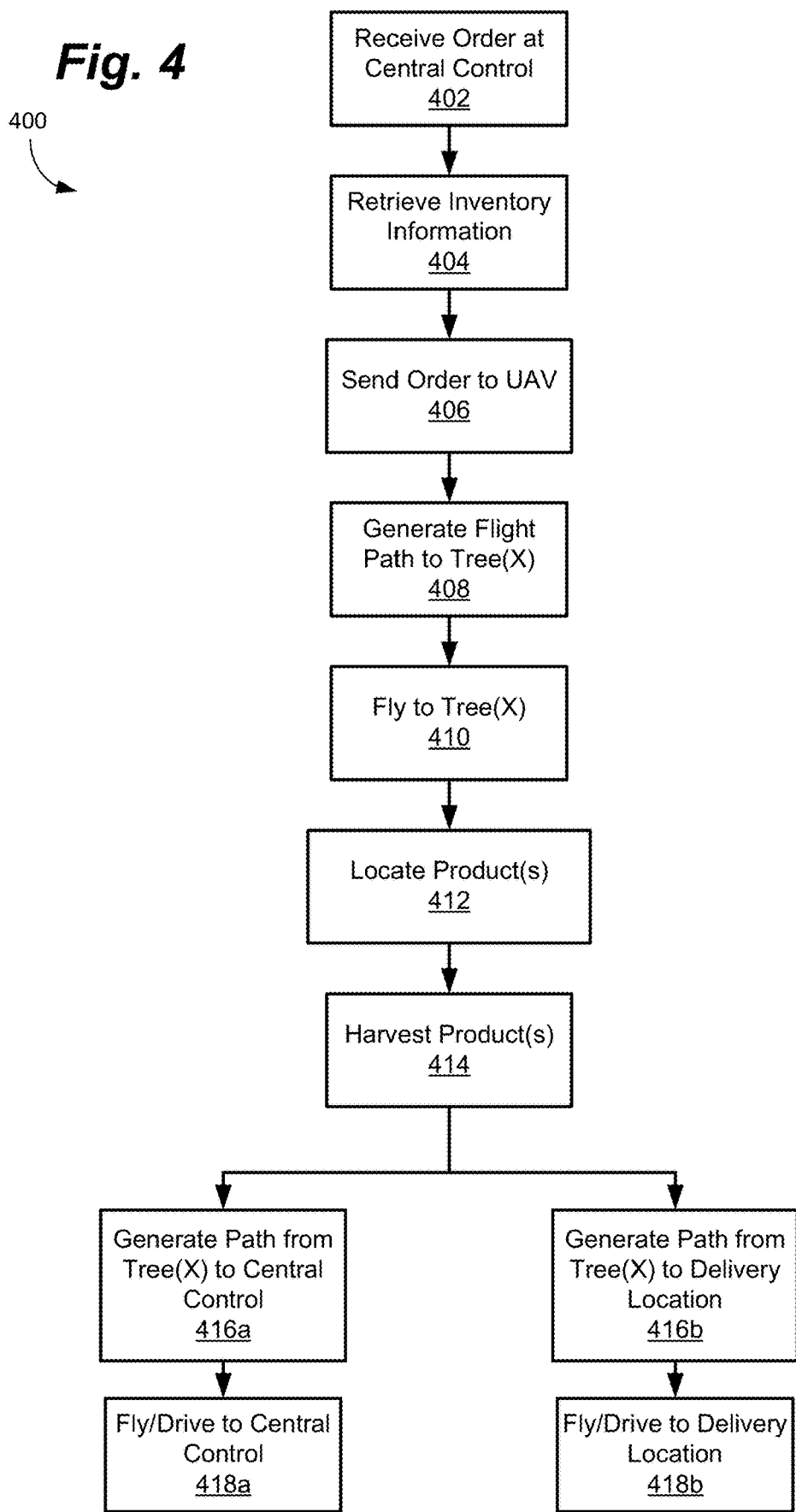
FIG. 4 is a flow diagram depicting a method for delivering a product to a central control or directly to a consumer, in accordance with some examples of the present disclosure.

As shown in FIG. 4, examples of the present disclosure can also comprise a method 400 for selecting products for delivery to the end consumer. The method 400 can enable products to be selected and delivered at peak ripeness, freshness, etc. The method 400 can also enable products to be selected based on transit time, intended use, etc. If a user orders a tomato intended for use in a salad in two days, for example, the method 400 can select a tomato that is approximately two days from being completely ripe.

At 402, the method 400 can begin with an order from a customer for a particular product. The customer can range from an individual ordering one or a few products or a grocery store ordering tons of products. As discussed above, the order can be received at the central control 204, for example, which can include a website, or other means, to order product and/or a warehouse with shipping and receiving facilities.

At 404, the central control 204 or UAV 100 can check the current inventory for a product to satisfy the order. As mentioned above, because the UAVs 100 provide more accurate and/or granular inventory control, the inventory can contain an accurate status for each tree 212, quadrant 214, or sector 216, enabling the desired product to be efficiently located. The inventory can include a status and an accurate location for the products. The status can include, for example, two days from ripe, one day from ripe, ripe, one day over ripe, two days over ripe, etc. So, if the consumer wishes to make guacamole tomorrow, for example, the method 400 may choose a product that is "one day from ripe." If the consumer wishes to buy bananas to make banana bread, on the other hand, the method 400 may choose "two days over ripe."

At 406, if the central control 204 has located the product (as opposed to the UAV 100), the central control 204 can send the order to the UAV 100. The order can include, for example, the number of products ordered, the desired ripeness, and the approximate location where the desired product is located. This may include a specific sector 216 in the area 202, a specific tree 212, and/or a specific quadrant 214, among other things.

At 408, the central control 204 or the UAV 100 can generate a flight path from the UAV's current location (e.g., the central control 204 or some other location in the area 202) to the location identified in the inventory. The flight plan can be the shortest distance from the current location to the location provided in the order or may include maneuvers designed to avoid adverse weather conditions, trees 212, or other obstacles. At 410, the UAV 100 can fly from its current location to the location provided by the central control 204.

At 412, in some cases, the UAV 100 can locate the products that meet the criteria in the order (e.g., size, quantity, ripeness, color, type, etc.). In some cases, such as in the case of produce, the location provided in the order provides the starting point, but some variability still exists even with a particular quadrant 214, for example. In other words, some, but not all, of the apples in a particular quadrant 214 on a tree 212 may be ripe, some less ripe, some more ripe. Thus, some assessment may be required to select the specific apples requested in the order. To this end, as discussed above, the UAV 100 can use the sensor package 108 to assess one or more products on a particular tree 212, for example, until a sufficient number of products that meet the order requirements (e.g., three bananas that are one day from ripe) are located.

At 414, the UAV 100 can harvest the product. Depending on the product, this can include the UAV 100 plucking the product from the tree 212 with the manipulators 116, cutting a branch near the product and removing it, or lifting the product off the shelf, among other things. In some examples, as discussed below, the UAV 100 can also let the product drop to the ground for retrieval by another machine (FIG. 5A) or provide a location to a harvester to enable the harvester to retrieve the product (FIG. 5B)—i.e., the UAV 100 serves only to precisely locate the product.

At this point, the UAV 100 can either deliver the product to the central control 204 for delivery or deliver the product directly to the consumer. At 416a, therefore, the UAV 100 can generate a path from the current location to the central control 204. At 418a, the UAV 100 can follow the path to the central control 204 to deliver the product to the central control 204. Of course, the UAV 100 could also simply deliver the product to a delivery vehicle such as, for example, another UAV, a van, or truck for delivery obviating the need to return to the central control 204. Indeed, in remote locations, such as farms, the delivery vehicles may be on site to receive product and delivery it to distribution centers or directly to consumers.

In this configuration, the central control 204 can be responsible for packaging and shipping the product(s) to the customer. In some examples, the central control 204 can include a packaging facility to consolidate the order (if the customer ordered more than one product) and then bag, box, or otherwise package the product. The central control 204 can also include a shipping facility to send the product to the customer. The central control 204 can deliver the product to the customer via the UAV 100 (dispatched from the central control), another UAV (e.g., a delivery UAV), a delivery truck, or a carrier (e.g., UPS or FedEx), etc.

In other cases, the UAV 100 can deliver the product directly to the customer. This may be because the product is highly perishable (e.g., flowers), to meet "just-in-time" inventory demands, or simply because the customer wants the product quickly (and is likely willing to pay for expedited shipping). At 416b, therefore, the UAV 100 or the central control 204 can generate a path from the UAV's current location to the delivery location. Of course, the delivery location should be within the range of the UAV 100, the product should be within the payload capacity of the UAV 100, etc.

At 418b, the UAV 100 can fly to the delivery location to deliver the product. The UAV 100 may fly directly to the customer's location (e.g., land in the front yard), to a local shipping and receiving facility near the customer, or to a set of automated lockers near the customer. Thus, the UAV 100 can complete the life cycle of the order—i.e., from the time of order to the time of deliver—efficiently, with fewer moving pieces, and within a very short amount of time.

As shown in FIG. 5A, examples of the present disclosure can also include a system 500 including the UAVs 100 and a transporter 502. In this configuration, the UAV 100 can still be responsible for locating and harvesting the product, but the transporter 502 can be responsible for delivering the product to the central control 204 or directly to the customer. Thus, the UAV 100 can remove the product from the tree 212, for example, and drop it, or lower it, to the ground for retrieval by the transporter 502.

This system 500 may be useful when the product exceeds the payload capacity of the UAV 100. The may also enable a smaller UAVs 100 to be used to reach hard to reach areas. Smaller UAVs 100, for example, may be able to fly in between the branches of the tree 212, for example, facilitating the harvesting of the product. In addition, simply harvesting, without transporting, the product can increase the time aloft for the UAV 100. In this manner, the UAVs 100 can be used to quickly and efficiently locate and harvest the products, while the transporter 502 (which isn't flying) can more efficiently deliver the product to the central control 204 or customer.

Depending on the product, the transporter 502 can comprise an automated robot, automated or manned tractor, or other vehicle operating within the area 202. The transporter 502 can include a scoop (shown) 504, a robotic arm, or other suitable method to retrieve the product. In some examples, the UAV 100 and the transporter 502 can receive product location data from the central control 204 when the order is received, and both vehicles 100, 502 can proceed to the location at substantially the same time—the UAV 100 can locate and harvest the product and the transporter 502 can receive and transport the product.

In some examples, the transporter 502 can comprise a track drive 506 (shown), wheels, or other drive (depending on location) to enable it to maneuver in the area 202. The transporter 502 can also include a drive system 508 comprising one or more motors 510, batteries 512, and controllers 514. In some examples, the transporter 502 can also include a navigation system 516 and a transceiver 518. The navigation system 516 can comprise, for example, a global positioning system (GPS) receiver, cellular locations services, or other suitable means to enable the transporter 502 to maneuver between the central control 204 and the area 202 for product retrieval.

In some examples, the transporter 502 can also have its own sensor package 520 to enable it to locate the product and/or navigate. So, for example, the transporter 502 can have one or more cameras 522, proximity sensors 524, pressure transducers 526, or other sensors. The transporter 502 can also use the sensor package 520 to verify the product is in the scoop 504, for example, prior to returning to the central control 204.

When an order is received at the central control 204, therefore, the central control 204 can access the inventory, for example, locate an approximate location for the requested product(s) and then dispatch the UAV 100 and the transporter 502. On location, the UAV 100 can precisely locate the desired product using the sensor package 108 and harvest the product from the tree 212.

At substantially the same time, the transporter 502 can travel from the central control 204 to the approximate location provided by the central control 204 and await a signal from the central control 204 or the UAV 100 that the product has been harvested and is located on the ground proximate the tree 212, for example. The transporter 502 can then retrieve the product and return it to the central control 204 or directly to the customer, depending on the system.

In some examples, the UAV 100 and the transporter 502 can be paired. In other words, the UAV 100 and the transporter 502 can have a wireless link (e.g., Wi-Fi or Bluetooth®) to enable the UAV 100 to update its location with the transporter 502 to enable the transporter 502 to simply follow the UAV 100 around. In other examples, the transporter 502 may use a camera or another device to follow the UAV 100 autonomously. Regardless, this can enable the UAV 100 to fly around and harvest products that are ready, with the transporter 502 following closely behind and retrieving them from the UAV 100 or the ground.

Figure 5B:
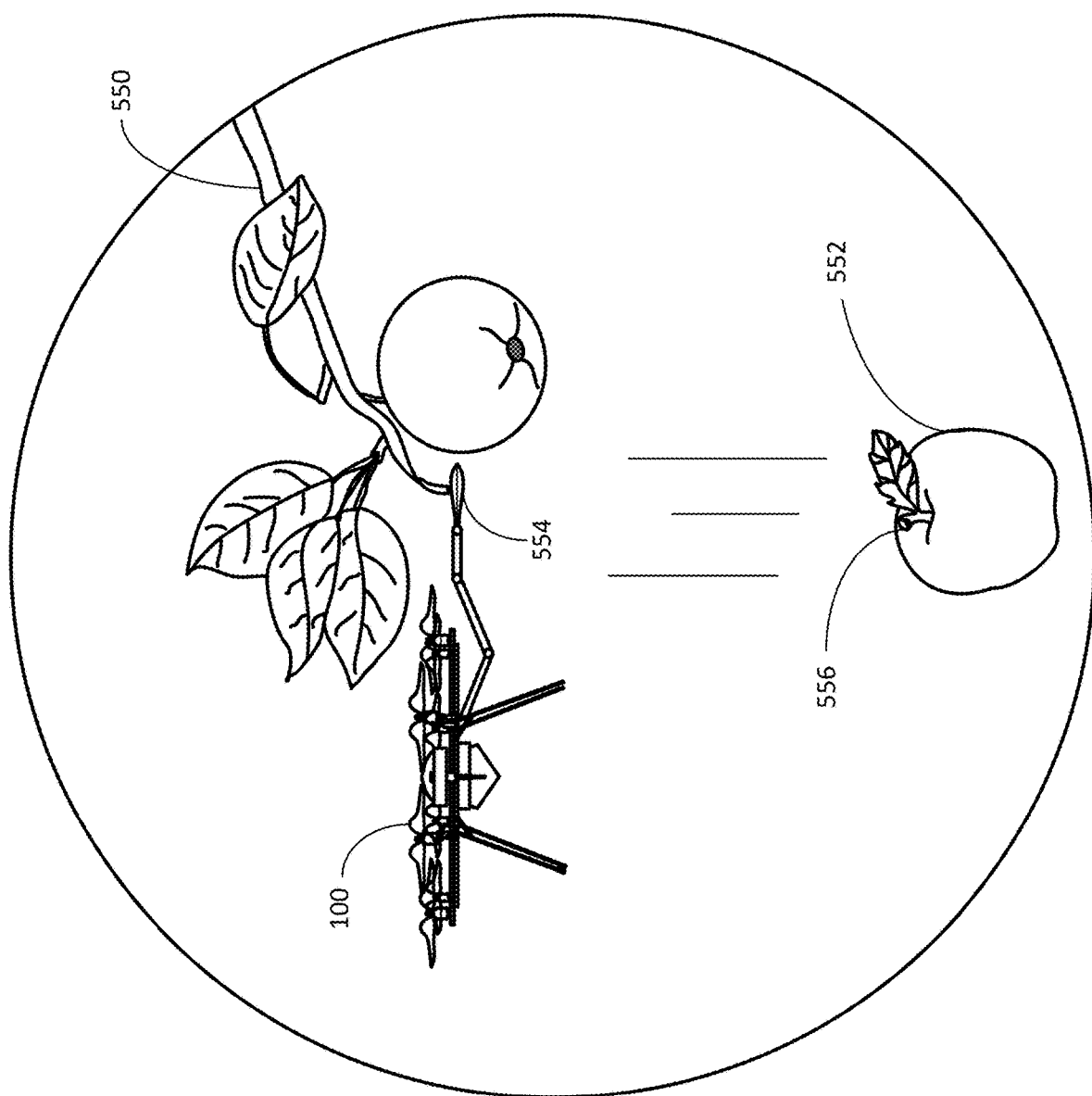
FIG. 5B depicts a UAV retrieving a product by cutting a branch or stem proximate the product, in accordance with some examples of the present disclosure.

As shown in FIG. 5B, in some examples, it may be impractical or impossible for the UAV 100 to "pick" the product. In other words, due to the proximity of branches 550 on the tree 212, for example, the UAV 100 may be unable to maneuver close enough to an apple 552, for example, to be able to pick it. Even if the manipulators 116 can reach the apple 552, for example, it may be extended to the point that the UAV 100 cannot maintain stability—i.e., the manipulators 116 exerts too much force on the UAV 100 due to leverage.

In this situation, it may be beneficial, therefore, to simply cut the branch 550 near the apple 552 with a cutter 554 on the manipulators 116 and let the apple 552 drop. This may enable the UAV 100 to maintain a safe distance from the tree 212, for example, or to approach the apple 552 from an increased altitude or at a different angle the avoids the surrounding branches 550. The cutter 554 can cut just the stem 556 of the apple 552 (shown) or a nearby branch 550 including the stem 556, or even a larger branch 550 with multiple apples 552 in the same basic location. The cutter 554 can also be used for pruning and other maintenance on the trees 212 during the normal course of business.

Figure 6:
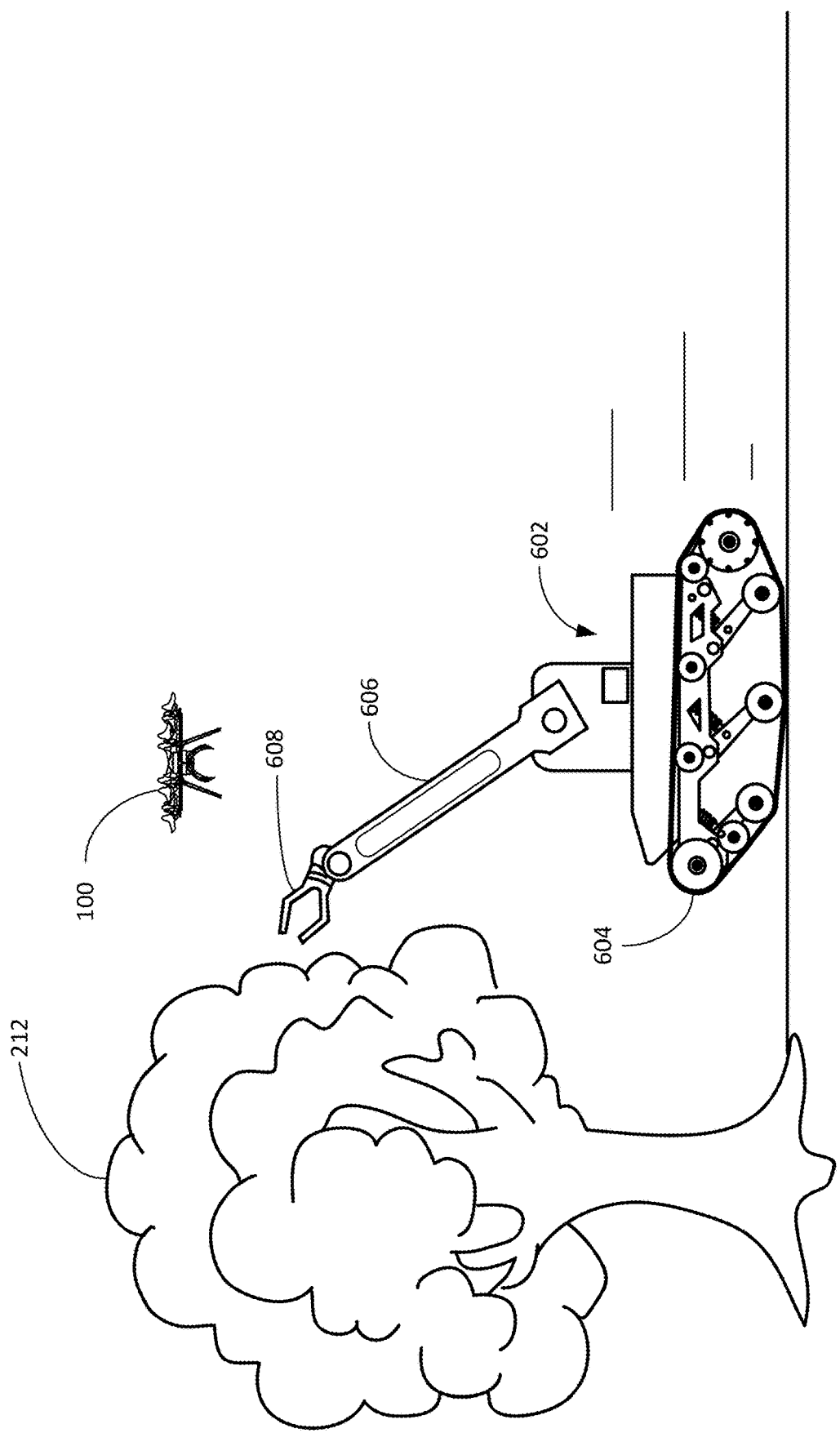
FIG. 6 depicts a UAV working in concert with a harvester to deliver a product to a central control, in accordance with some examples of the present disclosure.

As shown in FIG. 6, in some examples, the system 600 can include the UAV 100 and a machine specifically designed for harvesting, or a "harvester" 602. As shown, the harvester can include tracks 604 (shown), wheels, or skids, for example, to enable it to be move about the area 202. The harvester 602 can also have a robotic arm 606, shaker, or other device suitable for harvesting the relevant products.

In some examples, as shown, the harvester 602 can comprise a robotic arm 606 that can enable it to remove items from shelves, pick fruit or vegetables from trees, and otherwise manipulate items. Thus, in some examples, the robotic arm 606 can comprise a grasper 608 suitable to grab one or more products without damaging the product. Thus, for robust items, like boxes, apples, or pears, the grasper 608 can simply grab the item and remove it from the shelf or tree, as necessary.

In other cases, the robotic arm 606 can be modular to enable the grasper 608 to be swapped out for different tools for different jobs or products. In some examples, the grasper 608 can be replaced with a shaker to shake trees and/or bushes in the field. Thus, for crops like olives or cherries, where harvesting individual fruit may be impractical, the harvester 602 can simply shake the tree or bush and then collect the product as it falls (e.g., using a net) or from the ground after it has fallen.

This method may not be as selective as individual harvesting, but it saves a significant amount of time. In addition, while this method harvests the entire tree or bush at once, harvesting one tree at a time—as opposed to an entire orchard—can enable the user to select trees with a high percentage of ripe fruit, while leaving trees that are at different stages of development for later harvest. In this manner, trees can be harvested individually increasing yield and reducing spoilage. In addition, some products will fall from the tree more readily when ripe, somewhat improving the overall yield.

Regardless of the specific configuration, the harvester 602 can enable the UAV 100 to specialize in finding products that are ready for delivery. In other words, regardless of whether the UAV 100 can carry and/or harvest the product, the UAV 100 can nonetheless use the sensor package 108 to assess the product for readiness. Thus, products that are too heavy or obscured by branches to be directly harvested by the UAV 100, for example, can nonetheless be identified. The UAV 100 can then provide a very accurate location to the central control 204 and ultimately, the harvester 602. This location can then enable the harvester 602 to travel to the location and quickly retrieve the product using the robotic arm 606, or another suitable tool.

In some examples, the UAV 100 can identify product that meets the requirements of an order, for example, and then hover nearby to guide the harvester 602 to the location. In other examples, the UAV 100 can identify the products with a laser designator or another tool to enable the harvester 602 to identify the specific example of the product (e.g., a specific orange) that the UAV 100 has approved. In still other examples, the UAV 100 can simply provide (e.g., send the location to the central control 204 or the harvester 602) an updated location for the product that is sufficiently accurate to enable the harvester 602 to locate the product independently. Thus, the UAV 100 can provide an accurate GPS location, a tree number, a quadrant number, a height, and other information to enable the harvester 602 to locate the product. In some examples, the updated location can also include the aforementioned identification tag (e.g., a bar code number, RFID tag, or other identification tag) installed during inventory to enable the harvester 602 to accurately locate the product.

In some examples, the UAV 100 and harvester 602 can also work in concert for maintenance of the area 202. In other words, when taking inventory, the UAV 100 will inevitably identify product that has issues (e.g., rot, mold, mildew, insects, etc.). When identified, the UAV 100 can send an updated location to the harvester 602 for treatment. If the product is unsellable (e.g., severely overripe or rotten fruit, insect infestations, or other untreatable conditions), for example, the harvester 602 can simply remove the product from the tree 212, for example, and drop it on the ground, or otherwise disposed of it.

If the issue is mold, mildew, insects, or other problems that are treatable with chemicals, for example, the UAV 100 can provide the location and the harvester 602 can provide treatment. As mentioned above, the robotic arm 606 can be modular enabling the grasper 608 to be exchanged for a sprayer, for example. In this configuration, the UAV 100 can provide the updated location to the harvester 602 and the harvester 602 can apply a fungicide, or another suitable chemical. Indeed, the harvester 602 can also be used to provide fertilizers, and other chemicals, based on the highly granular assessment by the UAV(s) 100.

Figure 7:
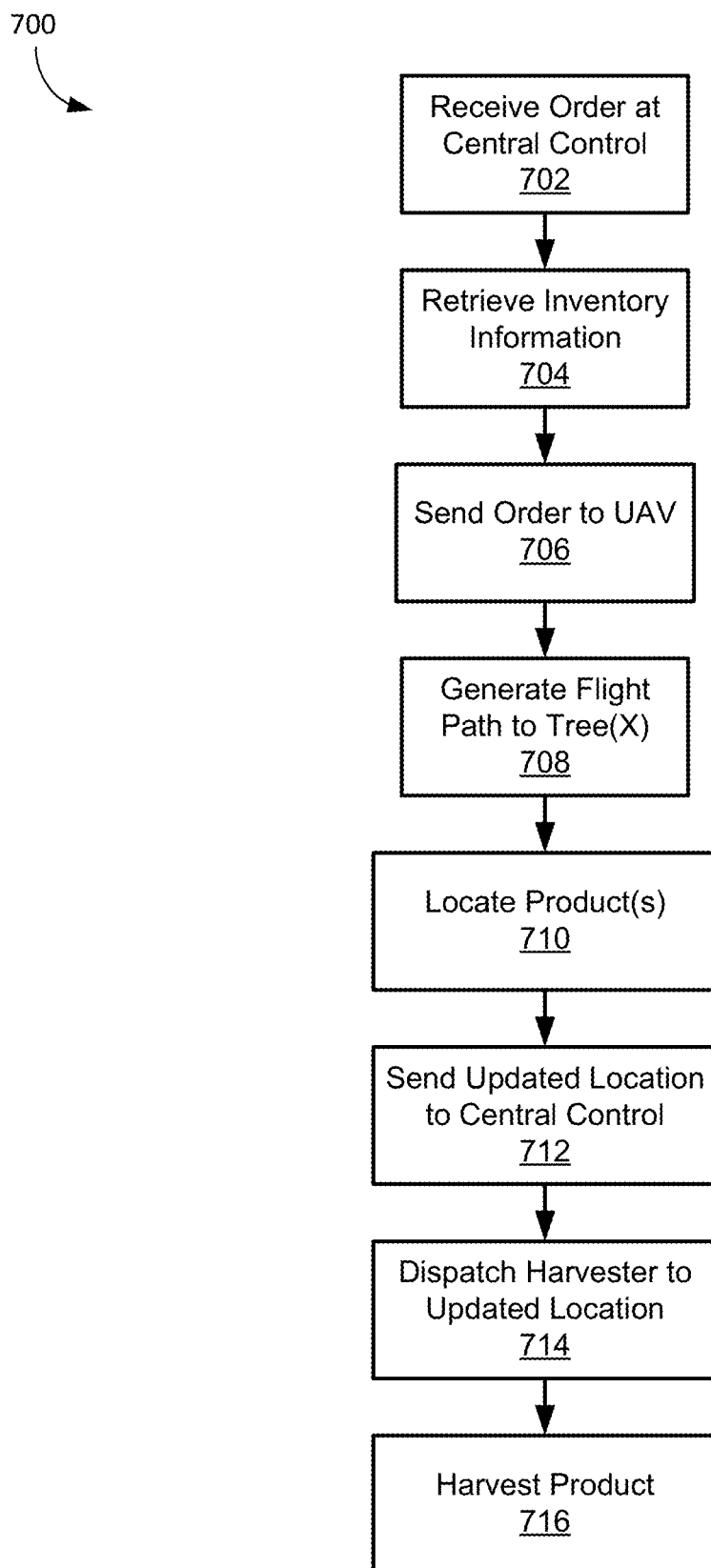
FIG. 7 is a flow diagram depicting a method for identifying products with a UAV and then harvesting the products with a harvester, in accordance with some examples of the present

As shown in FIG. 7, examples of the present disclosure can also comprise a method 700 of identifying products that are ready for delivery with the UAV 100 and then harvesting them with the harvester 602. To simplify and clarify explanation, FIG. 7 describes a method 700 in which the UAV 100 acts on orders from the central control 204 to fill orders. Of course, in other examples, the UAV 100 could simply fly a preset, or random, pattern through an area 202 and report any products deemed ready for delivery to the central control.

At 702, the method 700 can begin with an order from a customer for a particular product. The customer can range from an individual ordering a few products or a grocery store ordering tons of a product. As discussed above, the order can be received at the central control 204, for example, which can include a website, or other means, to order product and/or a warehouse with shipping and receiving facilities.

At 704, the central control 204 or UAV 100 can check the current inventory for a product to satisfy the order. As mentioned above, because the UAVs 100 provide more accurate and/or granular inventory control, the inventory contains an accurate status for each tree 212, quadrant 214, or sector 216, enabling the desired product to be efficiently located. The inventory can include a status and a relatively accurate location for the products. The status can include, for example, two days from ripe, one day from ripe, ripe, one day over ripe, two days over ripe, etc.

At 706, if the central control 204 has located the product (as opposed to the UAV 100), the central control 204 can send the order to the UAV 100. The order can include, for example, the number of products ordered, the desired ripeness, and the approximate location where the desired product is located. This may include a specific sector 216 in the area 202, a specific tree 212, and/or a specific quadrant 214.

At 708, the central control 204 or the UAV 100 can generate a flight path from the UAV's current location (e.g., the central control 204 or some other location in the area 202) to the approximate location. The flight plan can be the shortest distance from the current location to the approximate location or may include maneuvers designed to avoid adverse weather conditions, trees 212, or other obstacles. At 710, the UAV 100 can fly from its current location to the approximate location provided by the central control 204.

At 712, the UAV 100 can more specifically locate the products that meet the criteria in the order (e.g., size, quantity, ripeness, color, type, etc.). In some cases, such as in the case of produce, the approximate location provides the starting point, but some variability still exists even with a particular quadrant 214, for example. In other words, some, but not all, of the apples in a particular quadrant 214 on a tree 212 will be ripe, with some less ripe and some more ripe. Thus, some assessment may be required to select the specific apple(s) requested in the order. To this end, as discussed above, the UAV 100 can use the sensor package 108 to assess one or more products on a particular tree 212, for example, until enough products that meet the order requirements (e.g., three bananas that are one day from ripe) are located.

At 712, the UAV 100 can send an updated location to the central control 204 for the product(s). The updated location can be the location where the specific products requested were found and can provide a more accurate location for the products that the previously supplied approximate location from the central control 204. So, while the approximate may include a tree number and even a quadrant 214, the updated location can provide an exact location, in three-dimensional (3D) space where applicable. In some examples, the updated location can be provided by a highly accurate GPS receiver on the UAV 100. In other examples, sensors located in the area, such a range-finding radios or laser sensors, can receive a signal from the UAV 100 and triangulate its position with high accuracy. Indeed, in some examples, the updated location can be accurate enough to enable the harvester 602 to locate the product directly.

At 714, the central control can send a signal to the harvester 602 to dispatch the harvester 602 to the updated location. As mentioned above, the updated location can include, for example, 3D coordinates, GPS coordinates, or some local Cartesian coordinate system. The area 202 can include one or more laser sensors, for example to create a 3D grid over the area 202. The harvester 602 can include an accurate GPS receiver, a laser receiver, or other suitable means to accurately locate and harvest the product.

At 716, based on the accuracy of the updated location, the harvester 602 can essentially go directly to, and harvest, the product. Thus, while the harvester 602 may include some instrumentation (e.g., a camera) to fine tune the position of the robotic arm 606 or grasper 608, for example, the updated location can provide a very specific location and height from which to work. Once harvested, the harvester 602 can return to the central control 204, a shipping and handling facility, or other location, as appropriate.

As mentioned above, in some examples, the UAV 100 can simply fly a preset, or random, pattern through the area 202 and locate product that is ready for delivery. For a product that is basically only used when ripe and/or does not ripen once harvested, for example, harvesting the product at the peak may be of utmost importance. In this manner, the UAV 100 can simply fly from tree 212 to tree 212 identifying products that are ready for delivery and sending an updated location for each.

The harvester 602 can then harvest the products individually or in batches. This can reduce spoilage and decrease costs as the harvester 602 need only retrieve the product from each updated location without little to no additional analysis. This can also enable products to be harvested before they are overripe or rotten and not harvested when they are under ripe. Indeed, the method 700 can enable the products to be harvested in an essentially "custom" manner, but with much greater efficiency. In some examples, to further improve efficiency, the central control 204 may tally a plurality of updated locations from the UAV(s) 100 until enough products are reported in a particular area (e.g. a quadrant 214 or sector 216) and then dispatch the harvester 602 to harvest a bulk amount of the product all at once.

While several possible examples are disclosed above, examples of the present disclosure are not so limited. For instance, while a system using UAVs to maintain inventory and deliver produce is discussed above, the system could also be used for other perishable and non-perishable goods without departing from the spirit of the disclosure. In addition, the location and configuration used for various features of examples of the present disclosure such as, for example, the location of the manipulators or probe on the UAV, the relative locations of the areas 202 and the central control 204, and the types of UAVs used (e.g., multirotor copter vs. helicopter vs. fixed wing aircraft) can be varied according to a particular orchard, warehouse, or farm that requires a slight variation due to, for example, construction regulations, local codes and covenants, the type of UAV required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
sending, to a vehicle, a first instruction associated with traveling to a location within an agricultural environment that includes a product;
receiving, from the vehicle, data collected by one or more sensors of the vehicle at the location, the data being associated with determining a readiness for delivering the product;
determining, based at least in part on the data, that the product is ready for delivery; and
sending, to the vehicle, a second instruction that causes the vehicle to collect the product.

2. The method of claim 1, further comprising:
sending, to the vehicle, a first indication of a first route for traveling to the location within the agricultural environment;
sending, to the vehicle, a third instruction associated with delivering the product; and
sending, to the vehicle, a second indication of a second route for traveling from the location to a second location associated with delivering the product.

3. The method of claim 1, further comprising:
sending, to a second vehicle, a third instruction associated with traveling to a second location within the agricultural environment that includes a second product;
receiving, from the second vehicle, second data collected by one or more second sensors of the second vehicle at the second location, the second data being associated with determining a second readiness for delivering the second product;
determining, based at least in part on the second data, that the second product is ready for delivery; and
sending, to the second vehicle, a fourth instruction associated with collecting the second product.

4. The method of claim 1, further comprising:
receiving an order for the product; and
determining, among a plurality of vehicles, to instruct the vehicle to travel to the location within the agricultural environment.

5. The method of claim 1, further comprising sending, to a second vehicle, a third instruction associated with traveling to the location within the agricultural environment for collecting the product.

6. The method of claim 1, further comprising:
receiving, from the vehicle, second data collected by the one or more sensors of the vehicle at the location, the second data being associated with determining a second readiness for delivering a second product; and
determining, based at least in part on the second data, that the second product is ready for delivery or is yet to be ready for delivery.

7. The method of claim 6, further comprising, based at least in part on determining that the product is ready for delivery, updating an inventory database associated with the product.

8. A system comprising:
at least one processor; and
one or more non-transitory computer-readable media storing computer-executable instructions that, when executed by the at least one processor, cause the at least one processor to perform acts comprising:
sending an instruction to a vehicle for traveling to a location that includes perishable products;
receiving data collected by the vehicle at the location;
determining, based at least in part on data, an amount of the perishable products at the location being ready for delivery; and
based at least in part on the amount of the perishable products, one of:
determining to harvest the perishable products, or
determining to refrain from harvesting the perishable products.

9. The system of claim 8, the acts further comprising at least one of:
sending a third instruction to the vehicle for traveling to a second location associated with a second perishable product; or
sending a fourth instruction to the vehicle for traveling to a third location associated with a waiting area of the vehicle.

10. The system of claim 8, the acts further comprising sending a second instruction to the vehicle for delivering one or more of the perishable products, wherein the second instruction causes the vehicle to harvest the one or more perishable products and travel to a second location associated with one of storing the one or more perishable products or delivering the one or more perishable products to a consumer.

11. The system of claim 8, the acts further comprising, based at least in part on the data, updating an inventory database associated with the perishable products.

12. The system of claim 8, the acts further comprising:
determining a route associated with the vehicle traveling to the location; and
sending the route to the vehicle, wherein the vehicle is configured to utilize the route for traveling to the location.

13. The system of claim 8, the acts further comprising:
sending a second instruction to the vehicle for traveling to a second location that includes a second perishable product;
receiving second data collected by the vehicle at the second location, wherein the second data is associated with determining a second readiness of the second perishable product; and
based at least in part on the second data, one of:
determining that the second perishable product is ready for delivery; or
determining that the second perishable product is yet to be ready for delivery.

14. A method comprising:
receiving an order for a product;
determining, based at least in part on accessing an inventory database, an inventory of the product;
determining, based at least in part on the inventory, a location within an agricultural environment that includes the product;

selecting, among a plurality of vehicles and based at least in part on the location, a vehicle for traveling to the location;

causing the vehicle to travel to the location that includes the product;

receiving data generated by one or more sensors of the vehicle, the data being associated with determining a readiness for delivering the product; and determining, based at least in part on the data, that the product is ready for delivery or is yet to be ready for delivery.

15. The method of claim 14, wherein determining that the product is ready for delivery or is yet to be ready for delivery comprises determining that the product is yet to be ready for delivery, further comprising determining to refrain from delivering the product.

16. The method of claim 14, wherein determining that the product is ready for delivery or is yet to be ready for delivery comprises determining that the product is ready for delivery, further comprising causing the vehicle to harvest the product.

17. The method of claim 16, further comprising at least one of:

causing the vehicle to travel to a second location associated with delivering the product; or causing a second vehicle to travel to the location for receiving the product.

18. The method of claim 14, further comprising:

causing the vehicle to travel to a second location within the agricultural environment that includes a second product;

receiving second data from the vehicle, wherein the second data is associated with determining a second readiness of the second product; and determining whether the second product is ready for delivery.

19. The method of claim 14, further comprising:

causing a second vehicle to travel to a second location within the agricultural environment that includes a second product, wherein at the second location the second vehicle is configured to activate one or more sensors for determining a second readiness of the second product; and causing the second vehicle to deliver the second product based at least in part on the second product being ready for delivery.

20. The method of claim 14, wherein the location comprises a first location, further comprising:

determining, based at least in part on the inventory, a first example of the product and a second example of the product, the first example being stored in association with a first readiness of the product and the first location, the second example being stored in association with a second readiness of the product and a second location of the second example of the product within the agricultural environment; and determining, based at least in part on the first readiness and the second readiness, to cause the vehicle to travel to the first location, wherein determining that the product is ready for delivery or is yet to be ready for delivery comprises determining that the first example of the product is ready for delivery or is yet to be ready for delivery.

\* \* \* \* \*